United States Patent
Narain et al.

(10) Patent No.: US 8,725,902 B2
(45) Date of Patent: May 13, 2014

(54) OPTIMAL NETWORK CONFIGURATION REPAIR

(75) Inventors: Sanjai Narain, Madison, NJ (US); Konstantine Arkoudas, West New York, NJ (US)

(73) Assignee: TT Government Solutions, Inc., Basking Ridge, NJ (US)

( * ) Notice: Subject to any disclaimer, the term of this patent is extended or adjusted under 35 U.S.C. 154(b) by 106 days.

(21) Appl. No.: 13/532,376

(22) Filed: Jun. 25, 2012

(65) Prior Publication Data

US 2012/0331115 A1 Dec. 27, 2012

Related U.S. Application Data

(60) Provisional application No. 61/500,717, filed on Jun. 24, 2011.

(51) Int. Cl.
*G06F 15/173* (2006.01)

(52) U.S. Cl.
USPC ........... 709/248; 709/220; 709/224; 370/338; 370/509

(58) Field of Classification Search
USPC .......... 709/220, 224, 228, 248; 370/338, 474, 370/509
See application file for complete search history.

(56) References Cited

U.S. PATENT DOCUMENTS

| | | | |
|---|---|---|---|
| 7,000,031 B2 * | 2/2006 | Fischer et al. | 709/248 |
| 7,035,285 B2 * | 4/2006 | Holloway et al. | 370/474 |
| 7,388,853 B2 * | 6/2008 | Ptasinski et al. | 370/338 |
| 2003/0206559 A1 * | 11/2003 | Trachewsky et al. | 370/509 |
| 2009/0046593 A1 * | 2/2009 | Ptasinski et al. | 370/252 |
| 2009/0248597 A1 | 10/2009 | Fickie et al. | |
| 2009/0265296 A1 | 10/2009 | Narain et al. | |
| 2010/0251222 A1 | 9/2010 | Ganai | |
| 2010/0281306 A1 | 11/2010 | Sinha | |
| 2010/0306308 A1 | 12/2010 | Andraus | |

OTHER PUBLICATIONS

Dutertre et al., "The YICES SMT Solver," Computer Science Laboratory, SRI International, Apr. 24, 2009, <URL: http://yices.csl.sri.com/tool-paper.pdf>.

International Application No. PCT/US2012/044001—PCT International Search Report dated Aug. 29, 2012.

* cited by examiner

*Primary Examiner* — Khanh Dinh
(74) *Attorney, Agent, or Firm* — Heslin Rothenberg Farley & Mesiti P.C.

(57) ABSTRACT

Changing a network configuration to restore compliance to one requirement may invalidate the network compliance with another requirement. A method changes a configuration to restore compliance to all requirements at minimum cost. The requirements are a hybrid of symbolic, arithmetic and bit-vector constraints, so traditional optimization techniques such as linear programming, that work only for purely arithmetic constraints, do not apply. The requirements are represented as SMT (satisfiability-modulo-theory) constraints on configuration variables, and then a weighted Max-SAT solver is used to compute the optimal configuration changes in order to minimize the cost.

4 Claims, 1 Drawing Sheet

OPTIMAL NETWORK CONFIGURATION REPAIR

CROSS-REFERENCE TO RELATED APPLICATIONS

This application claims the benefit of U.S. Provisional Application No. 61/500,717, filed on Jun. 24, 2011, which is incorporated by reference herein in its entirety.

FIELD OF THE INVENTION

The present invention relates generally to a method of changing a network configuration to restore compliance to all requirements at a minimum cost. The requirements are a hybrid of symbolic, arithmetic and bit-vector constraints, so traditional optimization techniques such as linear programming, that work only for purely arithmetic constraints, do not apply.

BACKGROUND OF THE INVENTION

It is well-documented that configuration errors cause a large percentage of network downtime and vulnerabilities. Every network component has a finite number of configuration variables (or parameters or knobs) that need to be set to definite values to satisfy end-to-end requirements on security and functionality. Today, a human has to compute the detailed settings of all configuration variables. Since the conceptual gap between requirements and configuration is very large, a large number of configuration errors are made. It is analogous to the situation where compilers for high-level languages are not available and algorithms have to be implemented in assembly language.

The present invention for repairing configuration errors leverages weighted MaxSAT solvers for a Satisfiability Modulo Theories (SMT) language consisting of Equality of Uninterpreted Functions, arithmetic constraints and bit vector constraints. This language is expressive enough for specifying realistic network constraints. A good weighted Max-SAT solver for this SMT language is Yices. The Yices SMT Solver (Yices) is described by B. Dutertre and L. de Moura, The Yices SMT Solver. Tool paper, available online from yices.csl.sri.com/tool-paper.pdf.

The SMT paradigm can be seen as a generalization of classic (propositional) satisfiability. An input to an SMT solver is a quantifier-free formula with various interpreted and uninterpreted function and predicate symbols. Some SMT solvers accept quantified sentences, but the quantifier-free formula are typically removed (expanded away) in these SMT solvers by using various heuristics. The interpreted atoms of the formula come from various background theories, such as linear (integer and real) arithmetic, inductive data types (free algebras, scalar and recursive), uninterpreted functions with equality, the theory of lists, extensional arrays, fixed-size bit vectors, etc. The satisfiability of an input formula p is determined by these background theories, along of course with the Boolean structure of p. An SMT solver will not only determine whether p is satisfiable; if it is, it will also provide appropriate satisfying values for the free variables and/or constants that occur in p. Some SMT solvers also have very useful—albeit more expensive—facilities for computing unsat cores, and for solving weighted Max-SAT problems.

The weighted Max-SAT problem is a variation of the classic satisfiability problem that can model many optimization problems. The difference from the classical setting is that each clause has a unique positive weight associated with it. The task is to find a satisfying assignment for the input formula that maximizes the total weight, i.e., the sum of the weights of the clauses that are satisfied by the assignment. The Max-SAT problem by itself, without weights, is used to maximize the number of satisfied clauses. This can be seen as a special case of the weighted Max-SAT problem, in which every clause is given a weight of 1. Both the weighted and the non-weighted versions of Max-SAT problem are NP-hard. Polynomial-time approximation algorithms are known within a worst-case ratio of 0.785. Yices solvers can solve weighted Max-SAT formulations of SMT problems. Any SMT formula can be asserted with a positive weight, using the command assert+ instead of assert. An infinite weight can be given to an assertion p, effectively ruling out any solutions that falsify p.

SUMMARY OF THE INVENTION

An invention for allowing one to specify requirements at a high level and then automatically generating correct configurations, or repairing these, has previously been proposed in pending U.S. patent application Ser. No. 12/268,223 entitled "A Scalable and Interactive Method of Generating and Modifying Network Configurations to Enforce Compliance with High-Level Requirements." The present invention offers the following advantages over that method:

It solves the harder problem of optimally repairing configurations in that it minimizes the cost of changing the configurations to restore compliance with requirements.

It is simpler than the previous one in that the constraint solver only needs to be called once, not multiple times. The previous method used a SAT-based constraint solver whereas the current method uses a MaxSAT-based solver.

We now precisely define the problem:

1. The entire system configuration (Configuration DB) is modeled as a set of equations of the form $x_1=c_1, \ldots, x_k=c_k$ where each $x_i$ is a configuration variable of a network component and $c_i$ is its current value.

2. A requirement is a conjunction of constraints $F_1, \ldots, F_m$ where each $F_i$ is a Boolean function of the form $R(x_1, \ldots, x_k)$ of configuration variables $x_1, \ldots, x_k$. The language for specifying requirements is assumed to be a Satisfiability Modulo Theories (SMT) language with Equality of Uninterpreted Functions, Linear Arithmetic and Bit Vectors.

3. A configuration error exists if the values $c_1, \ldots, c_k$ are incorrect, i.e., the conjunction $F_1, \ldots, F_k$ is false in the context of these values. In other words, it is not possible to set $x_1, \ldots, x_k$ to $c_1, \ldots, c_k$ respectively and still satisfy each $F_i$.

4. Associated with each configuration variable is a cost of change. The cost is incurred if the variable value is changed.

5. Optimal-cost repair is finding new values of $x_1, \ldots, x_k$ such that the sum of the incurred change costs of all variables is a minimum.

The existence of an error can be diagnosed by using a SAT solver to solve the constraint:

$x_1=c_1 \& \ldots \& x_k=c_k \& F_1 \& \ldots \& F_m$ and having the solver return "unsolvable". The problem of optimal repair is much harder for the following reasons:

1. The space of possible combinations of configuration variable values is astronomical. Thus, we cannot enumerate all possible combinations of values and check whether they satisfy all requirements. Even a small enterprise's network can contain a few hundred routers, each with a few hundred configuration parameters, each with few hundred possible values. The total number of combinations would then be at least $(100*100)^{100}$.

2. We cannot solve this problem in a modular fashion, i.e., by finding each requirement Fi that is falsified and repairing the configurations to satisfy it in isolation. The new value could then falsify some other Fj. Then, repairing configurations to just satisfy Fj may falsify some other Fn or Fi itself causing a "ripple effect". We need to find new values of variables that concurrently satisfy all Fi.

3. It is not sufficient to find any repaired configuration. We need to find one that has least incurred change cost. For example, suppose interfaces on two different routers have identical IP addresses. One cannot arbitrarily change the address of one to be distinct from the other, as the new value may falsify other requirements (e.g., relating to tunnels, firewalls, and static routing) that use the old address. One would then have to recursively change the values of other variables in order to restore compliance with these requirements. It may well turn out that, changing the address of another interface might not cause such a ripple effect, and would therefore incur much smaller change cost.

We now show how our method efficiently solves the problem of optimal configuration repair and overcomes the above challenges. The method comprises the following three steps:
1. Specify that each requirement Fi has infinite change cost.
2. Specify that the weight of each constraint xi=ci is equal to its change cost.
3. Submit the constraint (x1=c1 & . . . & xk=ck) & (F1 & . . . & Fk) to the MaxSAT solver for our SMT language.

Theorem 1: If the MaxSMT solver returns a solution to the above constraint, that solution satisfies $F_1 \hat{} . \hat{} F_m$ and finds values for $x_1, \ldots, x_k$ with minimum incurred change cost.

PROOF: That the solution satisfies each Fi is obvious, since each such constraint has infinite cost and must therefore be satisfied by any solution. Next, let V be the set of all configuration variables $\{x_1 \ldots, x_k\}$. For any $V' \underline{\forall} V$, we define $$\text{cost}(V') = \sum_{x_i \in V'} \text{cost}(x_i)$$

where $\text{cost}(x_i)$ denotes the cost associated with changing $x_i = c_i$. Now let S comprise the set of all and only those variables in V whose values were changed by the solution we obtained from the MaxSMT solver. (Accordingly, V|S comprises those variables whose values were not changed by the solution, i.e., whose values are jointly consistent with the $F_i$ requirements.) We claim that cost(S) is minimum, i.e., there is no other subset $T \forall V$ such that $$\text{cost}(T) < \text{cost}(S). \quad (1)$$

We prove this by contradiction: Assume (1) holds for some $T \neq S$ such that changing the values of all and only those variables in T suffices (for consistency with the $F_i$ requirements). Observe that for any two disjoint subsets $V_1, V_2$ of V, we have $$\text{cost}(V_1 \cup V_2) = \text{cost}(V_1) + \text{cost}(V_2).$$

Hence, $$\text{cost}(T) + \text{cost}(V|T) = \text{cost}(S) + \text{cost}(V|S),$$

as $$T \cup (V|T) = S \cup (V|S) = V.$$

H
But then this identity, in conjunction with (1), would entail cost(V|T)>cost(V|S). But this is impossible because the variables in V|T have unchanged values, as do the values in V|S. That is, the identities $\{x_{j1}=c_{j1}, \ldots x_{jn}=c_{jn}\}$, where $\{x_{j1}, x_{jn}\}=T$, would be a subset of the original variable identities that is consistent with all the $F_i$ requirements and have a collective cost (weight) greater than the collective cost of $$\{x_{p1}=c_{p1}, \ldots, x_{p1}=c_{p1}\},$$

where $\{x_{p1}, \ldots, x_{p1}\}=S$. That contradicts the assumption that the latter is a maximum-weight subset of $\{x_1=c_1, \ldots, x_k=c_k\}$ consistent with the $F_i$ requirements.

While optimization algorithms such as linear programming are well-developed, these do not apply to optimal network configuration repair. This is because these algorithms only work when constraints are arithmetic, not the SMT constraints as in the case of networks.

Optimal network configuration repair is described in Xinming Ou, Sudhakar Govindavajhala, and Andrew W. Appel. Mulval: a logic-based network security analyzer. In Proceedings of the 14th conference on USENIX Security Symposium—Volume 14, pages 8-8, which explores the use of SAT solvers for minimum-cost reconfiguration. However, this system only computes configuration variables to be changed; it does not actually compute their new values. Furthermore, MulVAL uses Datalog to specify requirements but Datalog cannot specify large classes of network requirements on network logical structures with arithmetic and bit vector operations. Datalog does not even have true negation that is critical for specifying safety properties such as "something bad should not be true". By contrast, our SMT language has all of the above expressive power.

Preliminary evaluation with real configurations indicates that our method is of practical value. Encoding the SMT problem, solving it, and decoding the solution does not take more than a few seconds in evaluations of the invention, even for problems comprising dozens of routers with configuration files containing tens of thousands of commands.

DETAILED DESCRIPTION

Figure 1:
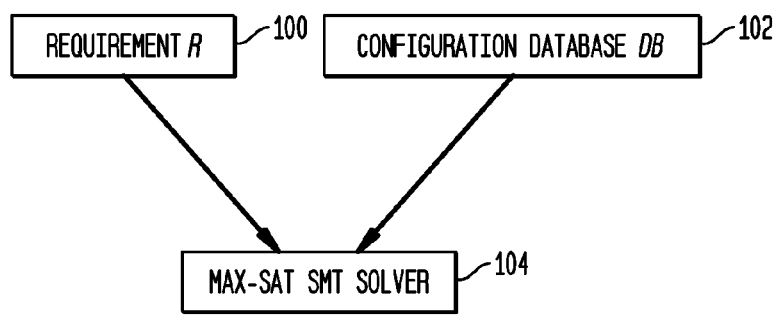
FIG. 1 is a schematic high-level depiction of a system for practicing the present invention.

A high-level structure of the present invention is shown in FIG. 1. The configuration requirement R 100 is an arbitrary constraint over the configuration variables, expressed in the SMT (Satisfiability-Modulo-Theory) fragment of first-order logic. As explained below, SMT languages can be regarded as Boolean logic with data structures with quantification over finite domains. They are not only fairly expressive (much more so than propositional logic), but also admit very efficient solvers that can solve hundreds of thousands of constraints in a similar number of variables in seconds.

The set of current values of configuration variables (the configuration database DB 102) is modeled as a (long) conjunction of equations of the form $x_i=c_i$, where $x_i$ is a configuration variable, represented by a term $x_i$, and $c_i$ is a value of the appropriate sort (typically either Boolean or integer). In addition, there is a positive weight attached to each equation, indicating the relative importance of the equation, or, equivalently, the cost of violating it. The greater the weight of $x_i=c_i$, the more expensive it is to change the value of $x_i$ from $c_i$ to some other value. DB is said to be non-compliant with R iff R^DB is unsatisfiable.

Two fundamental questions now arise. First, which configuration variables should be set to different values in order to restore compliance of DB to R? Second, since there can be many ways of changing variable values to restore compliance, which of these ways incurs the lowest cost in the sense of minimizing the sum of the weights of the changed variables? This two-fold question has a natural formulation as a weighted Max-SAT problem: A solution that maximizes the total weight is precisely one that minimizes the total violation cost, i.e., the sum of the costs of all the equations that were not satisfied. Accordingly, both questions can be answered by submitting R^DB to a Max-SAT solver 104. Such a solver accepts as input a conjunction of constraints. It allows one to specify weights with each constraint. It tries to satisfy a subset of constraints such that sum of the weights of satisfied constraints is a maximum. By letting R have an infinite weight and each equation in DB have a finite weight, Max-SAT answers both the above questions. Note that R needs to have an infinite weight in order to ensure that only constraints in DB are relaxed, not in R.

EXAMPLE

Removing Duplicate IP Addresses

We now illustrate the method
with a simple example, that of removing duplicate IP addresses at minimum cost. If two addresses are identical then changing one over another can incur different change costs. The present invention finds the one whose change incurs least cost.

Figure 2:
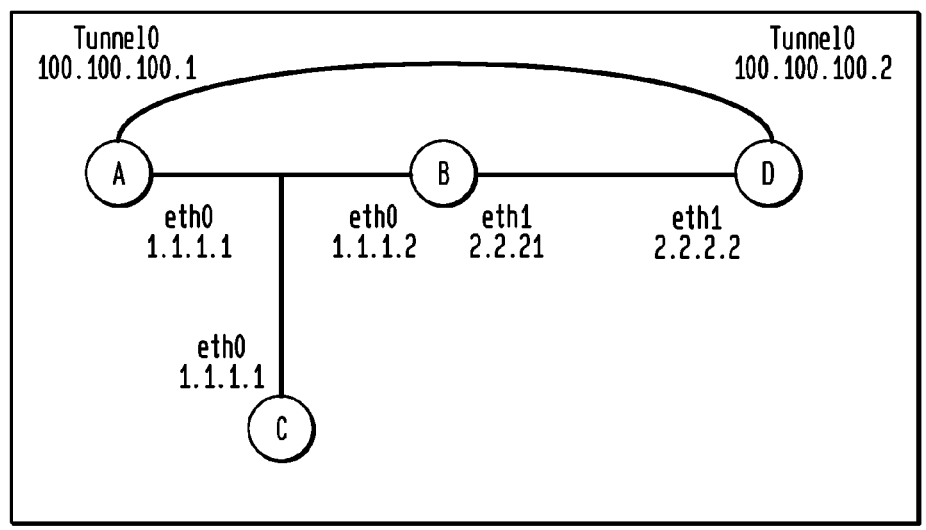
FIG. 2 schematic representation of an example illustrating the principle of the invention.

Referring to FIG. 2, there is shown routers A, B and C connected in the subnet 1.1.1.0/24, while routers B and C are connected in the subnet 2.2.2.0/24. The IP addresses of interfaces on these subnets are as shown. A GRE tunnel 100.100.100.0/24 between routers A and D has been configured with the IP addresses of the tunnel endpoints as shown. The local and remote GRE addresses of A/Tunnel0 are those of A/eth0 and D/eth1, respectively. Similarly, the local and remote GRE addresses of D/Tunnel0 are those of D/eth1 and A/eth0. Erroneously, C/eth0 and A/eth0 have the same IP address 1.1.1.1. It is necessary to make their addresses distinct. However, changing the address of A/eth0 incurs the additional cost that the local GRE address of A/Tunnel0 and the remote GRE address of D/Tunnel0 would have to change. Changing the address of C/eth0 does not incur these costs. Assuming that the cost of each configuration change is 1, changing the IP address of C to 1.1.1.3 is an optimal solution.

We show how to formalize this reasoning using the inventive method. The specification is the conjunction of the following requirements:

A. subnet 1.1.1.0 24 A eth0 B eth0 C eth0
B. subnet 2.2.2.0 24 B eth1 D eth1
C. gre tunnel 100.100.100.0 24 A Tunnel0 eth0 D Tunnel0 eth1

Requirement A states that A/eth0, B/eth0 and C/eth0 are on the same subnet 1.1.1.0/24. This is compiled into a conjunction of the following SMT constraints:

1. The IP addresses of A/eth0, B/eth0 and C/eth0 are distinct.
2. The bitwise AND of the IP address of each of these interfaces with a mask of 24 bits is equal to 1.1.1.0.

Requirement B is translated similarly. Requirement C is translated into a conjunction of the following SMT constraints:

3. The IP addresses of A/Tunnel0 and D/Tunnel0 are distinct.
4. The bitwise AND of the IP address of each of these interfaces with a mask of 24 bits is equal to 1.1.1.0.
5. The GRE local physical address of A/Tunnel0 is equal to the IP address of A/eth0.
6. The GRE remote physical address of A/Tunnel0 is equal to the IP address of D/eth0.
7. The GRE local physical address of D/Tunnel0 is equal to the IP address of D/eth0
8. The GRE remote physical address of D/Tunnel 0 is equal to the IP address of A/Tunnel0.

Each of these constraints is assigned infinite change cost, or weight. The configuration database DB is the conjunction of the following equations, each with unit change cost:

1. ip-address(A,eth0)=1.1.1.1
2. ip-address(B,eth0)=1.1.1.2
3. ip-address(C,eth0)=1.1.1.1
4. mask(A,eth0)=24
5. mask(B,eth0)=24
6. mask(C,eth0)=24
7. ip-address(B,eth1)=2.2.2.1
8. ip-address(D,eth1)=2.2.2.2
9. mask(B,eth1)=24
10. mask(D,eth1)=24
11. gre-local-physical(A,Tunnel0)=1.1.1.1
12. gre-remote-physical(D,Tunnel0)=1.1.1.1
13. gre-remote-physical(A,Tunnel0)=2.2.2.2
14. gre-local-physical(D,Tunnel0)=2.2.2.2
15. ip-address(A,Tunnel0)-100.100.100.1
16. ip-address(D,Tunnel0)=100.100.100.2
17. mask(A,Tunnel0)=24
18. mask(D,Tunnel0)=24

Now, the conjunction of constraints 1-8 and equations 1-18 is unsolvable. This is because equations 1 and 3 contradict constraint 1. The contradiction can be removed by changing the IP address of A/eth0 to be different from that of C/eth0, or vice versa. The cost of changing the first is higher (3) whereas the cost of changing the second is lower (1). MaxSAT does indeed choose the second alternative. When the conjunction of constraints 1-8 and equations 1-18 is submitted to Max-SAT, it returns a solution:

ip-address(C,eth))=1.1.1.3
cost=1

This means that only one variable, the IP address of C/eth0, needed to be changed. We can insist that this interface retain its current value by making it into constraint (with infinite change cost):

ip-address(C,eth))=1.1.1.1

Now, when the conjunction of requirements and equations is submitted to MaxSAT, it produces the following solution:

ip-address(A,eth0)=1.1.1.3
gre-local-physical(A,Tunnel0)=1.1.1.3
gre-remote-physical(D,Tunnel0)=1.1.1.3
cost=3

This forces a change to the IP address of A/eth0 but the cost is much higher (3) because two other variables need to be changed: the GRE attributes that depend on this address also need to be changed.

The Yices system allows one to associate weights with constraints. If a weight is not associated, it is assumed to be infinite.

We now provide a sense of the Yices constraints that are generated from the above requirements. We use fixed-size bit vectors for encoding IP addresses. Yices has a built-in type (bitvector n) for fixed-size bit vectors, where n is a positive integer indicating the length of the vector. Yices also provides a number of useful primitive functions for manipulating bit vectors. We only mention the ones that appear in this patent specification: mk-bv, bv-shift-left0, and bv-and. The first is a constructor for bit vectors. Specifically, a term of the form (mk-bv n v) denotes a bit vector of n bits, set to the value v (where v is a non-negative integer, expressed in regular decimal notation). If b is a bit vector of length n, then (bv-shift-left0 b i) is the bit vector obtained by shifting b to the left by i bits, provided that i is less than n. Finally, bv-and is bitwise-and on bit vectors. We have declared the function ip-address to take a network node (such as A) and a node port (such as eth0) and give a bit vector. Likewise for the functions gre-remote-physical and gre-local-physical. The function mask takes a node and a node port and gives an integer (the corresponding mask value). With this background, representative Yices constraints that requirement A is translated into are:

(assert+(not (=(ip-address A eth0)
(ip-address B eth0))))
(assert+(not (=(ip-address A eth0)
(ip-address C eth0))))
(assert+(not (=(ip-address B eth0)
(ip-address C eth0))))
(assert+(=(mask A eth0) 24))
(assert+(=(bv-and (bv-shift-left0 (mk-bv 32 4294967295)
    8)(ip_address A eth0)) (mk-bv 32 16843008)))

The last encodes the fact that the bitwise AND of A/eth0's IP address and a 24 bit mask is equal to the integer representation of 1.1.1.0. Since no weight is explicitly associated with these constraints, Yices assumes these weights to be infinite. Requirement C is translated into:

(assert+(=(gre-local-physical A Tunnel0) (gre-remote-physical D Tunnel0)))
(assert+(=(gre-remote-physical A Tunnel0) (gre-local-physical D Tunnel0)))

Equations 1, 11, 12 are respectively translated into:
(assert+(=(ip-address A eth0) (mk-bv 32 16843009)) 1)
(assert+(=(gre-remote-physical A Tunnel0) (mk-bv 32 16843009)) 1)
(assert+(=(gre-local-physical D Tunnel0) (mk-bv 32 16843009)) 1)

A weight of 1 is explicitly associated with each equation as the second argument of assert+.

The result is the removal of duplicate IP address with minimal cost.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions stored in a computer or machine usable or readable storage medium or device, which causes the computer or machine to perform the steps of the method when executed on the computer, processor, and/or machine. A computer readable storage medium or device may include any tangible device that can store a computer code or instruction that can be read and executed by a computer or a machine. Examples of computer readable storage medium or device may include, but are not limited to, hard disk, diskette, memory devices such as random access memory (RAM), read-only memory (ROM), optical storage device, and other recording or storage media.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

While there has been described and illustrated a method of changing network configuration to restore compliance to all requirements at a minimum cost, it will be apparent to those skilled in the art that variations and modifications are possible without deviating from the broad principles of the present invention which shall be limited solely by the scope of the claims appended hereto.

What is claimed is:

1. A method of changing network configuration modeled as a set of equations of the form $x_1=c_1, \ldots, x_k=c_k$ where each $x_i$ is a configuration variable of a network component and $c_i$ is its current value to restore compliance to all requirements where a requirement is a conjunction of constraints $F_1, \ldots, F_m$ where $F_i$ is a Boolean function of the form $R(x_1, \ldots, x_k)$ of configuration variables $x_1, \ldots, x_k$ at a minimum cost, comprising the steps of:

specifying each requirement $F_i$ has infinite change cost;

specifying the weight of each constraint $x_i=c_i$ is equal to its change cost; and submitting the constraint $(x_i=c_i \,\&\, \ldots \,\&\, x_k=c_k) \,\&\, (F_1 \,\&\, \ldots \,\&\, F_k)$ to a MaxSAT solver;

whereby the MaxSAT solver returns a solution that satisfies $F_1 \,\&\, \ldots \,\&\, F_k$ and finds values of $x_1, \ldots, x_k$ with minimum incurred change cost.

2. The method as set forth in claim 1, wherein the MaxSAT solver is a Yices SMT Solver.

3. The method as set forth in claim 1, wherein the language for specifying requirements is a Satisfiability Modulo Theories (SMT) language eith Equality of Uninterpreted Function, Linear Arithmetic and Bit Vectors.

4. A computer readable storage medium storing a program of instructions executable by a machine to perform a method for of changing network configuration modeled as a set of equations of the form $x_1=c_1, \ldots, x_k=c_k$ where each $x_i$ is a configuration variable of a network component and $c_i$ is its current value to restore compliance to all requirements where a requirement is a conjunction of constraints $F_1, \ldots, F_m$ where $F_i$ is a Boolean function of the form $R(x_1, \ldots, x_k)$ of configuration variables $x_1, \ldots, x_k$ at a minimum cost, comprising the steps of:

specifying each requirement $F_i$ has infinite change cost;

specifying the weight of each constraint $x_i=c_i$ is equal to its change cost; and submitting the constraint $(x_i=c_i \,\&\, \ldots \,\&\, x_k=c_k) \,\&\, (F_1 \,\&\, \ldots \,\&\, F_k)$ to a MaxSAT solver;

whereby the MaxSAT solver returns a solution that satisfies $F_1 \,\&\, \ldots \,\&\, F_k$ and finds values of $x_1, \ldots, x_k$ with minimum incurred change cost.

* * * * *